(12) United States Patent
Kreekon (10) Patent No.: US 10,224,706 B2
(45) Date of Patent: Mar. 5, 2019

(54) FUSE BOX FOR MITIGATING ARC FAULTS AND CURRENT SURGES

(71) Applicant: Nicholas Kreekon, Rockwall, TX (US)

(72) Inventor: Nicholas Kreekon, Rockwall, TX (US)

( * ) Notice: Subject to any disclaimer, the term of this patent is extended or adjusted under 35 U.S.C. 154(b) by 365 days.

(21) Appl. No.: 15/154,781

(22) Filed: May 13, 2016

(65) Prior Publication Data

US 2016/0336730 A1    Nov. 17, 2016

Related U.S. Application Data

(60) Provisional application No. 62/160,750, filed on May 13, 2015.

(51) Int. Cl.
*H02H 1/00* (2006.01)
*H02H 7/22* (2006.01)
*H02H 3/08* (2006.01)
*H01H 83/00* (2006.01)
*H02H 3/16* (2006.01)

(52) U.S. Cl.
CPC ............ *H02H 1/0023* (2013.01); *H02H 7/22* (2013.01); *H01H 83/00* (2013.01); *H02H 3/08* (2013.01); *H02H 3/167* (2013.01)

(58) Field of Classification Search
CPC .................................................. H02H 1/0023
See application file for complete search history.

(56) References Cited

U.S. PATENT DOCUMENTS

| | | | | |
|---|---|---|---|---|
| 4,067,052 A | * | 1/1978 | Neuhoff | H02H 1/0023 361/42 |
| 5,933,308 A | * | 8/1999 | Garzon | H01H 33/26 361/5 |
| 7,035,068 B2 | * | 4/2006 | Shea | H02H 1/0023 250/227.11 |
| 8,564,915 B2 | * | 10/2013 | Roscoe | H02H 1/0023 361/42 |

* cited by examiner

*Primary Examiner* — Stephen W Jackson (57) ABSTRACT

A fuse box that is designed to prevent damage caused by arc faults and electrical overcurrent. The apparatus is configured to function as a circuit breaker. The apparatus includes a housing, a circuit breaker, an optical sensor, and an electronic controller. The housing is an enclosure that isolates the circuit breaker from light and protects the components from physical damage. The circuit breaker opens the circuit between connected electrical systems when arc fault or an electrical overcurrent is detected. The optical sensor detects arc faults and relays notifications to the electronic controller. The electronic controller enables a user to set the thresholds for arc faults, currents, and voltages that cause the circuit breaker to open.

19 Claims, 9 Drawing Sheets

FUSE BOX FOR MITIGATING ARC FAULTS AND CURRENT SURGES

The current application claims a priority to the U.S. Provisional Patent application Ser. No. 62/160,750 filed on May 13, 2015.

FIELD OF THE INVENTION

The present invention relates generally to a circuit breaker. More specifically, the present invention is a circuit breaker with integrated electrical components that prevent damage caused by arc faults and electrical overcurrent.

BACKGROUND OF THE INVENTION

Traditional circuit breakers make use of current limiting fuses and shunt tripping devices. While these circuit breakers prevent electrical power surges from damaging electrical circuitry, they frequently do not address the problem of arcing faults. This is a significant oversight because arc faults are frequently the cause of fires and damage to equipment. To address the issue of arc faults optical sensors have been incorporated into traditional circuit breakers. These optical sensors detect the light generated by an arc fault and then generate signals that cause the circuit to be opened. This is a beneficial point of redundancy, however, many arc fault detection systems do not respond fast enough to prevent electrical damage.

The objective of the present invention is to overcome these problems. By employing the use of an optically triggered circuit breaking system, the present invention is able to reduce the damage resulting from arc faults. In addition to an optically triggered circuit breaking system, the present invention makes use of traditional current and voltage controlled trip switches to mitigate the damage caused by arc faults and electrical overcurrent.

SUMMARY OF THE INVENTION

The present invention is a fuse cartridge which is designed for electrical systems to mitigate the effects of an arcing fault. Safety of personnel working in the proximity of electrical equipment is the goal. Commercially available optical arc fault sensors are generally installed in the downstream of the majority of electrical distribution systems. In these devices, the optical sensors send a signal to open the upstream fuses through a fiber optic circuit. This signal, from the protected equipment, is interpreted by an optical sensor in the fuse and used to trigger the heat source in the fuse. The heat source then melts the fuse element in less than 0.07 seconds. A signal from the external arc fault sensor is sent to the fuse cartridge through a fiber optic connection. This insulates the fuse cartridge from the signal source. The optical sensor, within the fuse cartridge, closes an internal electrical circuit to trigger a heat source. The power to trigger the heat source comes from the voltage drop across the fuse cartridge main element. Additionally, an increased current in the power system is detected functions as another indication that an arcing fault is occurring.

The present invention makes use of optical and current monitoring sensors to determine when damaging electrical events are occurring within an electrical circuit. There are two methods to supply the source of heat to melt the fuse. The choice of method depends on the speed of action desired. One method employs a chemical explosive charge like DHT (dihydrazino-tetrazine). A sensor is used to energize the circuit which triggers an explosive reaction. The DHT explosive charge melting the main fuse element in under 0.07 seconds. A second method employs an electrical heating element is used to energize the circuit which triggers the heating element. The present invention can be used in any electrical power distribution system and located upstream from the equipment to be protected. Additionally, the present invention makes use of external sensors to determine the existence of an arc fault.

DETAILED DESCRIPTION OF THE INVENTION

All illustrations of the drawings are for the purpose of describing selected versions of the present invention and are not intended to limit the scope of the present invention.

Figure 1:
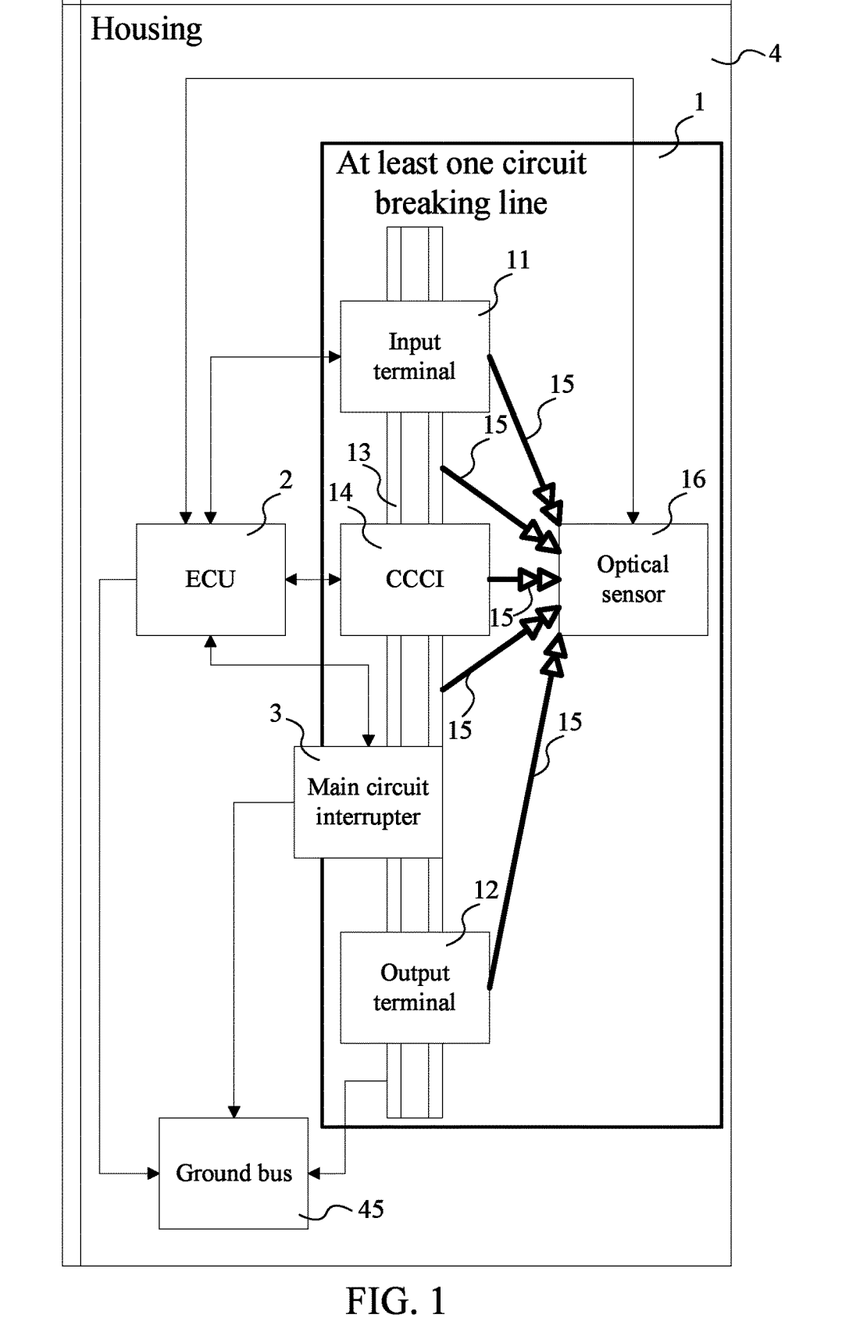
FIG. 1 is a block diagram illustrating the connections between the components of the present invention.

In reference to FIG. 1, the present invention is a fuse box that interrupts the circuit between electrical systems when the measured current, voltage, or electrical arc exceed user-selected thresholds. In its preferred embodiment, the present invention is configured as a circuit breaker, which protects an electrical circuit that is connected to an external power supply. The present invention comprises at least one circuit breaking line 1, an electronic control unit 2 (ECU), a main circuit interrupter 3, and a housing 4. The at least one circuit breaking line 1 an electrical conductor that is used to interrupt the current flowing from the external power supply into an electrical circuit. The ECU 2 is a computing device that is used to set user-selected electrical power thresholds and to monitor the electrical state of the at least one circuit breaking line 1. In addition, the ECU 2 generates control signals that instruct the main circuit interrupter 3 to open or close the at least one circuit breaking line 1. The main circuit interrupter 3 is used to interrupt the flow of electrical power through the at least one circuit breaking line 1 in response to control signals generated by the ECU 2. The housing 4 is an enclosure that is used to mechanically support and to electrically isolate the electronic components of the present invention.

Figure 3:
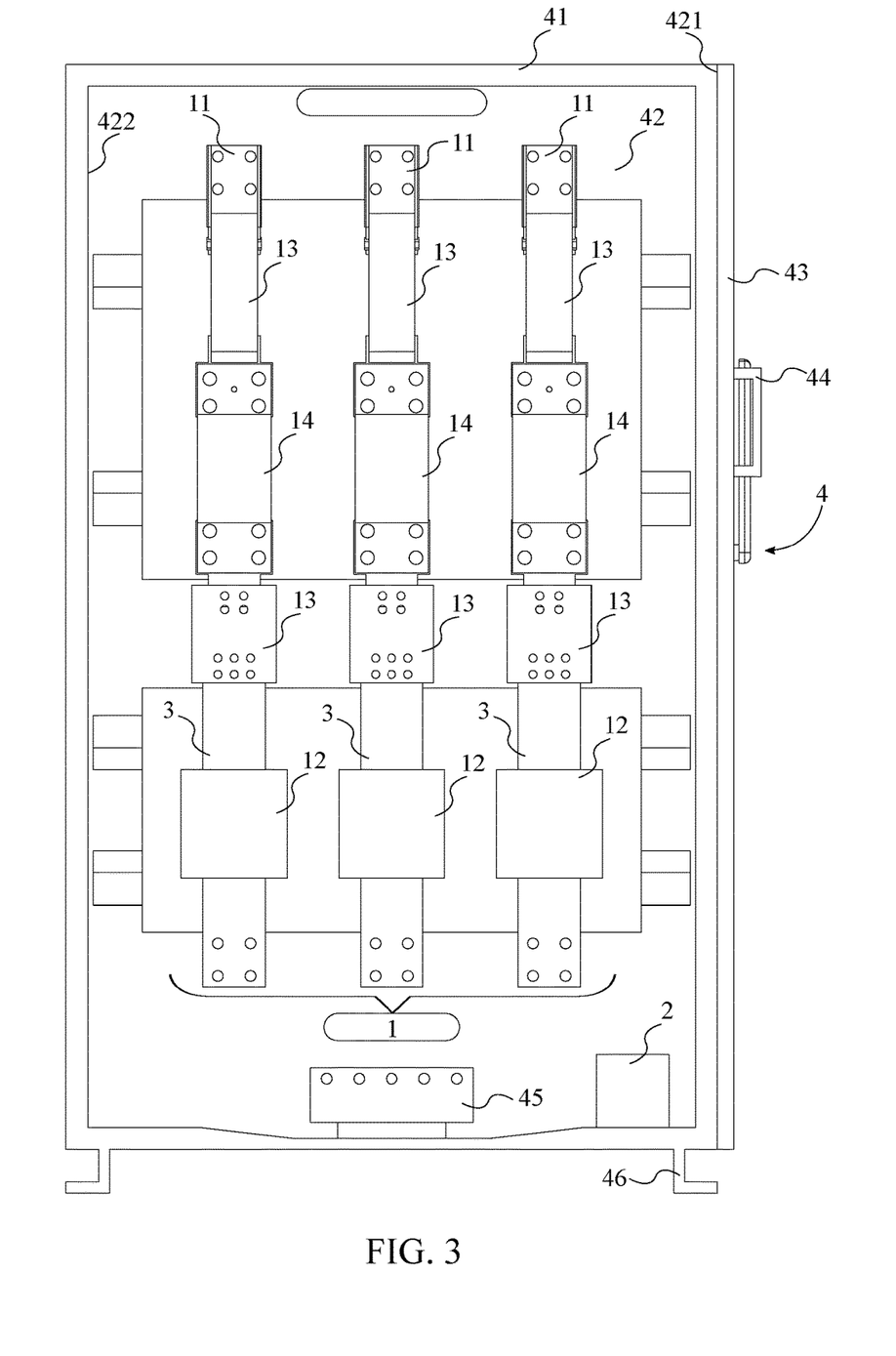
FIG. 3 is a front view of the housing used in the present invention wherein the door of the housing is in an opened configuration.
Figure 4:
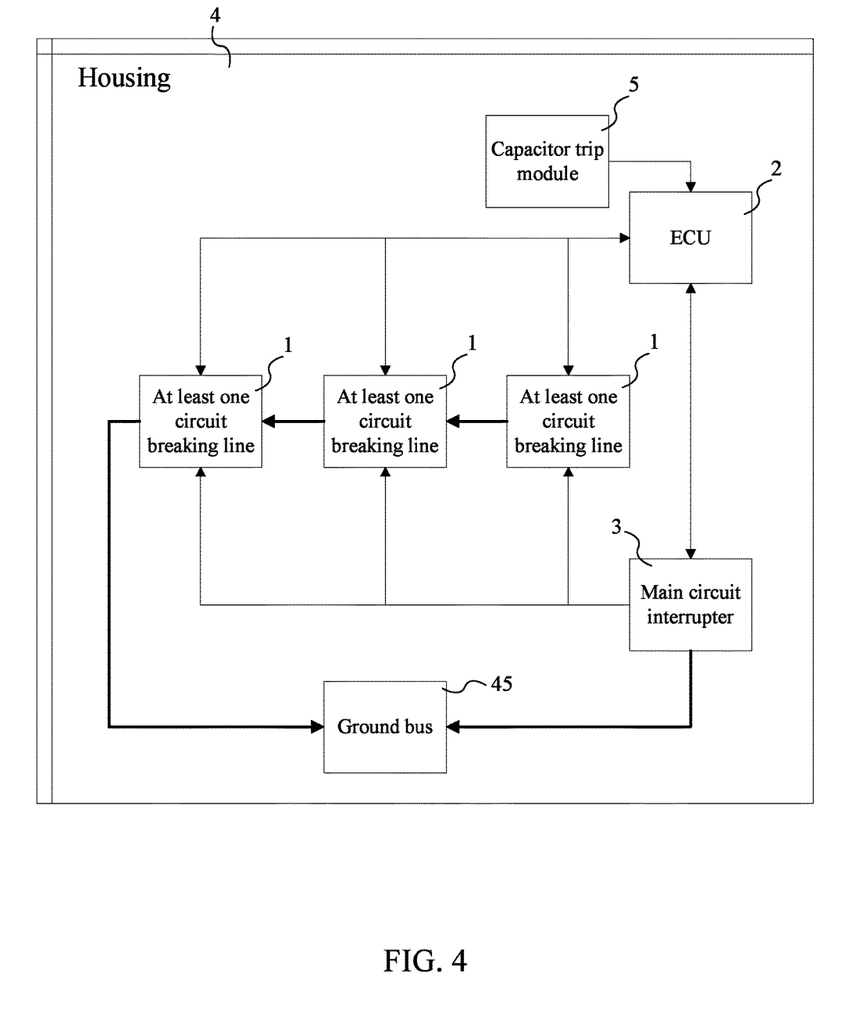
FIG. 4 is a block diagram illustrating the connections between the components of an embodiment of the present invention, wherein the embodiment uses a capacitor trip as a secondary power source for the ECU.

In reference to FIG. 1 and FIG. 3, in the preferred embodiment of the present invention, the aforementioned components work in concert to protect a connected electrical circuit from damage caused by arc fault, overcurrent, and short circuit. To accomplish this circuit protection functionality, each of the at least one circuit breaking lines 1 comprises an input terminal 11, an output terminal 12, a transmission line 13, a current controlled circuit interrupter 14 (CCCI), an arc light receiver, and an optical sensor 16. The input terminal 11 is an electrical interface that is used to connect the at least one circuit breaking line 1 to an external power supply so that electrical power can be transferred into the present invention. Conversely, the output terminal 12 is an electrical interface that is used to connect the at least one circuit breaking line 1 to the connected electrical circuit so that electrical power can be transferred out of the present invention. The transmission line 13 is an electrical conductor that is used to connect the input terminal 11 to the output terminal 12 so that electrical power can flow from the input terminal 11 to the output terminal 12. The CCCI 14 is an electronic component that opens a connected circuit when the voltage or current values flowing through the circuit exceed user-selected thresholds. In addition, the input terminal 11, the CCCI 14, the output terminal 12 is electrically connected in series through the transmission line 13. As a result, electrical power arriving at the output terminal 12 does not exceed user-selected thresholds.

The main circuit interrupter 3 is an electrical switch that is electrically integrated into the transmission line 13 for each of the at least one circuit breaking lines 1. As a result, the main circuit interrupter 3 is able to stop the flow of electrical power through the at least one circuit breaking line 1. In the preferred embodiment of the present invention, the arc-light receiver 15 is a light transferring device that is laterally positioned along the transmission line 13 so that the light generated by any arcing faults can be collected by the arc-light receiver 15. The optical sensor 16 is a light detecting electronic component that is in optical communication with the arc-light receiver 15. As a result, the light generated by arcing faults is transferred through the arc-light receiver 15 to the optical sensor 16. In addition, the optical sensor 16 and the CCCI 14 are electronically connected to the ECU 2 so that the ECU 2 is able to monitor the electrical state of the at least one circuit breaking line 1. The ECU 2 is electronically connected to the main circuit interrupter 3 so that the ECU 2 is able to break the transmission line 13 for a specific circuit breaking line if either the optical sensor 16 or the CCCI 14 detects an electrical fault.

Figure 2:
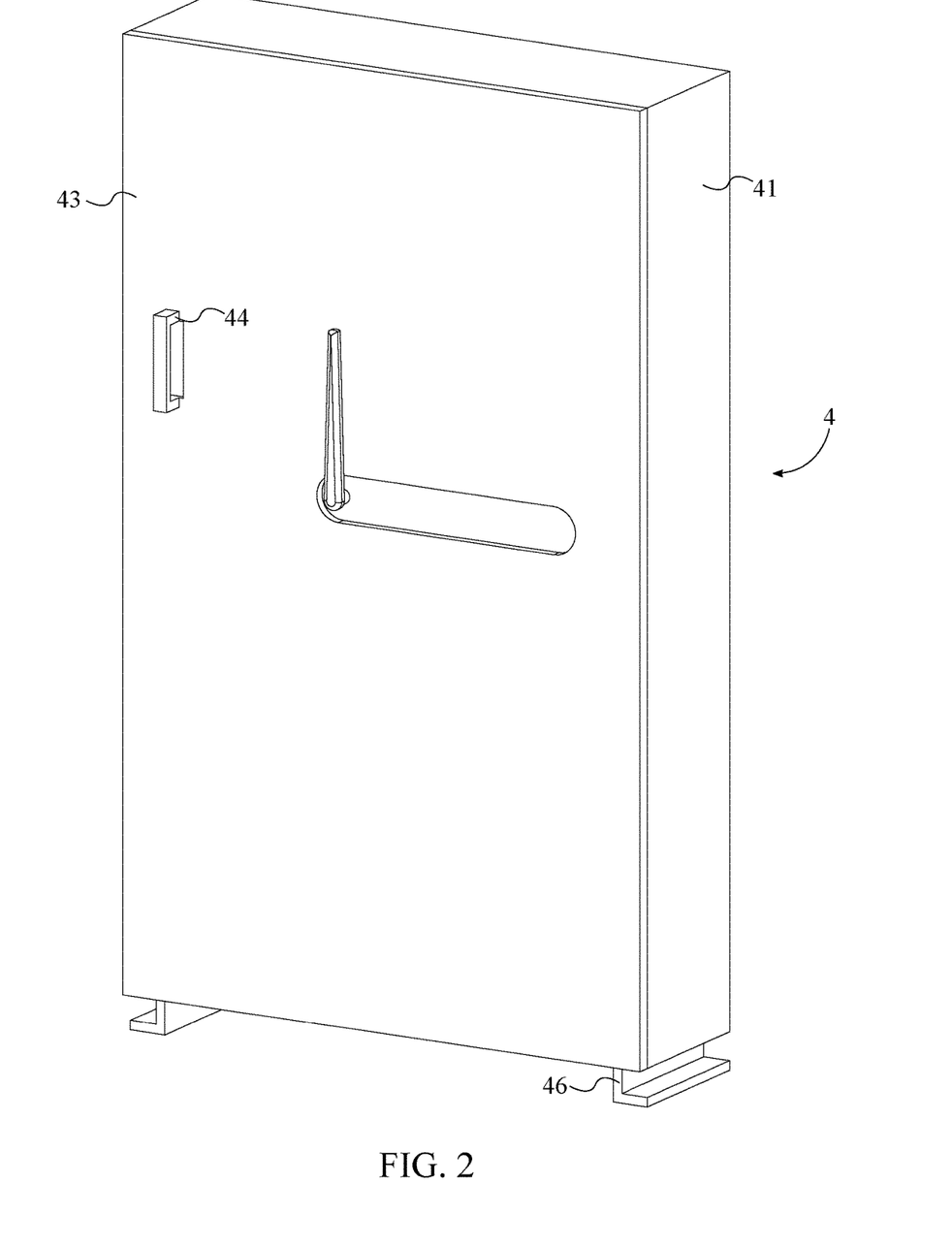
FIG. 2 is a perspective view of the housing used in the present invention.

In reference to FIG. 1, FIG. 2 and FIG. 3, in the preferred embodiment of the present invention, the housing 4 is a rigid enclosure that is used to maintain the at least one circuit breaking line 1, the ECU 2, and the main circuit interrupter 3 in desired positions. In addition, the housing 4 protects these components from physical damage and is used to mount the fuse box onto an external surface. In addition, the housing 4 maintains the at least one circuit breaking in a dark environment that facilitates arc fault detection. The housing 4 comprises a main body 41, a component compartment 42, a door 43, a locking mechanism 44, a ground bus 45, and an external mounting mechanism 46. The main body 41 is the structural base of the housing 4 that provides its overall shape. The component compartment 42 is cavity that traverses through one side of the housing 4 into the main body 41 so that that the electronic components of the present invention can be mounted within the housing 4. The door 43 is hingedly and adjacently connected to the main body 41 at a first edge 421 of the component compartment 42 so that the door 43 can be moved between an opened configuration and a closed configuration. When the door 43 is in the opened configuration a user is able to access the component compartment 42. Conversely, when the door 43 is in the closed configuration access to the component compartment 42 is restricted. The locking mechanism 44 is adjacently connected to the door 43, opposite the main body 41. As a result, the locking mechanism 44 is able to retain the door 43 in the closed configuration while engaged. A user must disengage the locking mechanism 44 to move the door 43 into the opened configuration. The ground bus 45 is mounted within the component compartment 42 so that the ground bus 45 can be connected to an external electrical ground terminal. The external mounting mechanism 46 is mounted adjacent to the main body 41, opposite the door 43, so that the housing 4 can be attached to external surface. The at least one circuit breaking line 1, the ECU 2, and the main circuit interrupter 3 are mounted within the component compartment 42 so that these are maintained in desired positions within the housing 4. The at least one circuit breaking line 1, the ECU 2, and the main circuit interrupter 3 are electrically connected to the ground bus 45 so that these components share a common electrical ground.

Figure 5:
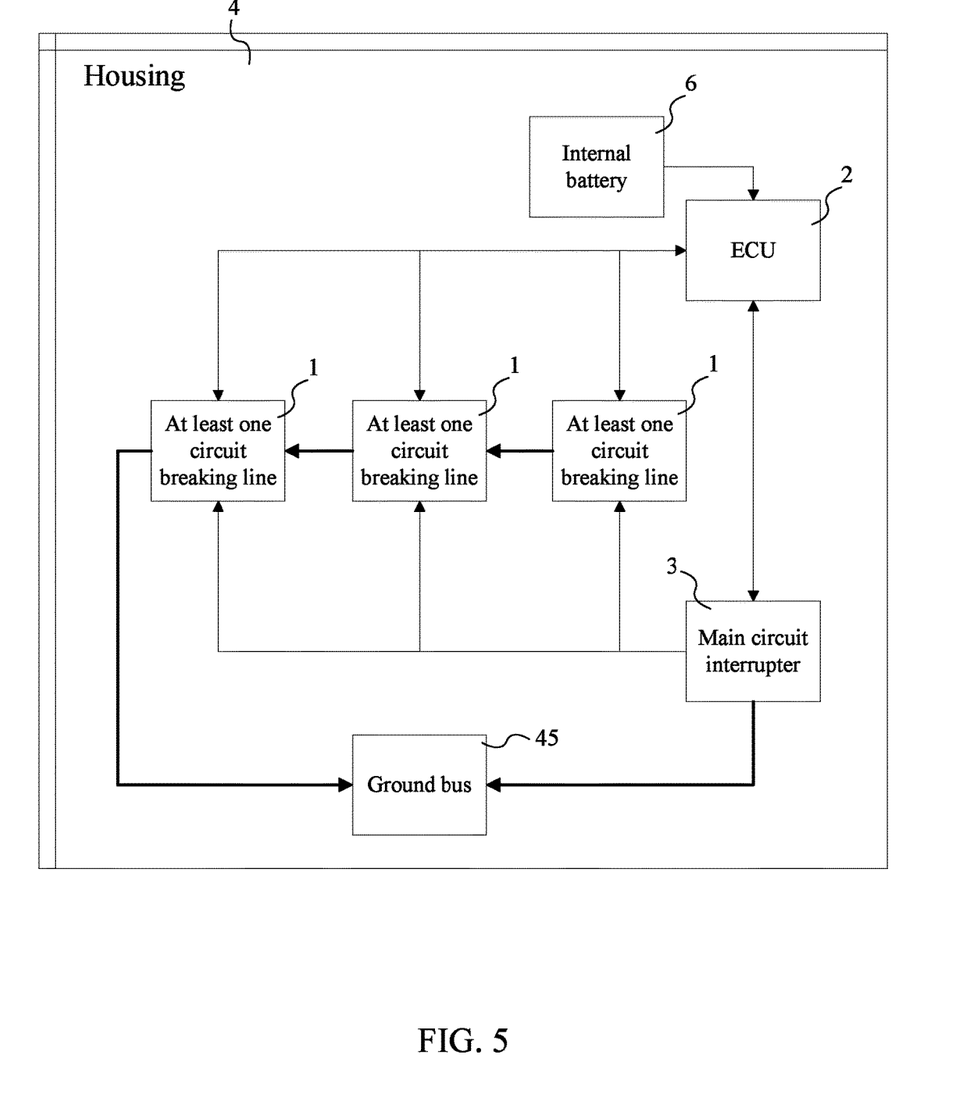
FIG. 5 is a block diagram illustrating the connections between the components of another embodiment of the present invention, wherein the embodiment uses an internal battery as a secondary power source for the ECU.

In reference to FIG. 1 and FIG. 5, in some embodiments of the present invention, a capacitor trip module 5 is a device that acts as a secondary power supply in the event of a primary power supply failure. The ECU 2 is electrically connected to the capacitor trip module 5 so that the ECU 2 is able to remain powered on in the event of a power failure. In other embodiments, the ECU 2 is electrically connected to an internal battery 6, so that the ECU 2 can operate in the event of an external power supply failure. In the preferred embodiment of the present invention, output terminal 12 for one of the at least one circuit breaking lines 1 is electrically connected to the ECU 2 so that the ECU 2 can be powered by a portion of the electrical power delivered to a connected electrical circuit.

Figure 6:
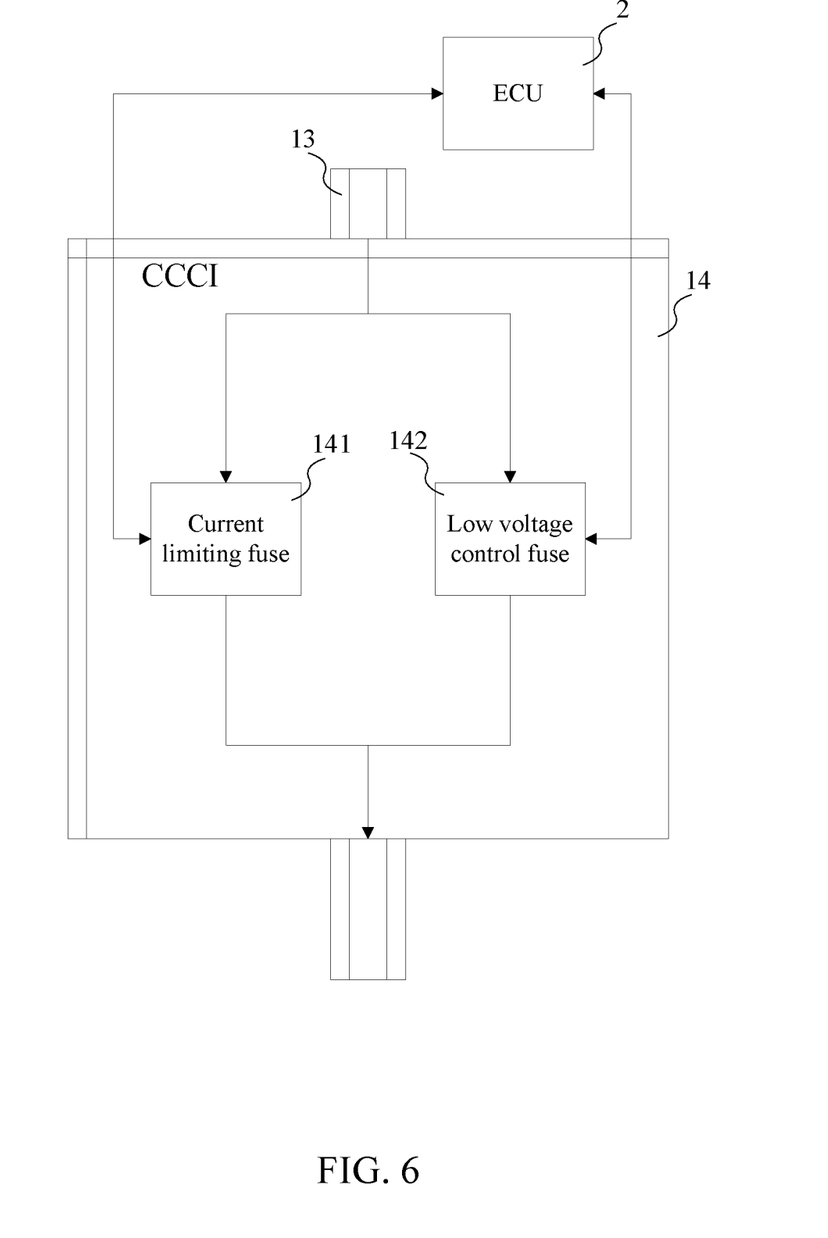
FIG. 6 is a block diagram illustrating the connections between the components of the CCCI used in the present invention.

In reference to FIG. 6, in the preferred embodiment of the present invention, the CCCI 14 comprises a current limiting fuse 141 and a low voltage controlled fuse 142. The current limiting fuse and the low voltage controlled fuse 142 are electrically connected in parallel to each other so that the two fuses may function independently of one another. The current limiting fuse is a fuse that becomes blown when the current flowing from the input terminal 11 to the output terminal 12 exceeds a user-selected threshold. The low voltage controlled fuse 142 is a fuse that becomes blown when the voltage between the input terminal 11 and the output terminal 12 drops below a user-selected threshold. Both the current limiting fuse and the low voltage controlled fuse 142 are electronically connected to the ECU 2 so that a user is able to set the thresholds at which the fuses are blown. In addition, the ECU 2 monitors the electrical power flowing through the current limiting fuse and the low voltage controlled fuse 142. As a result, a command to open the main circuit interrupter 3 is generated when either the current limiting fuse or the low voltage controlled fuse 142 is blown. In the event that the at least one circuit breaking line 1 is a plurality of circuit breaking lines, the main circuit interrupter 3 is able to open the circuits between the input terminal 11 and the output terminal 12 of each circuit breaking line.

Figure 8:
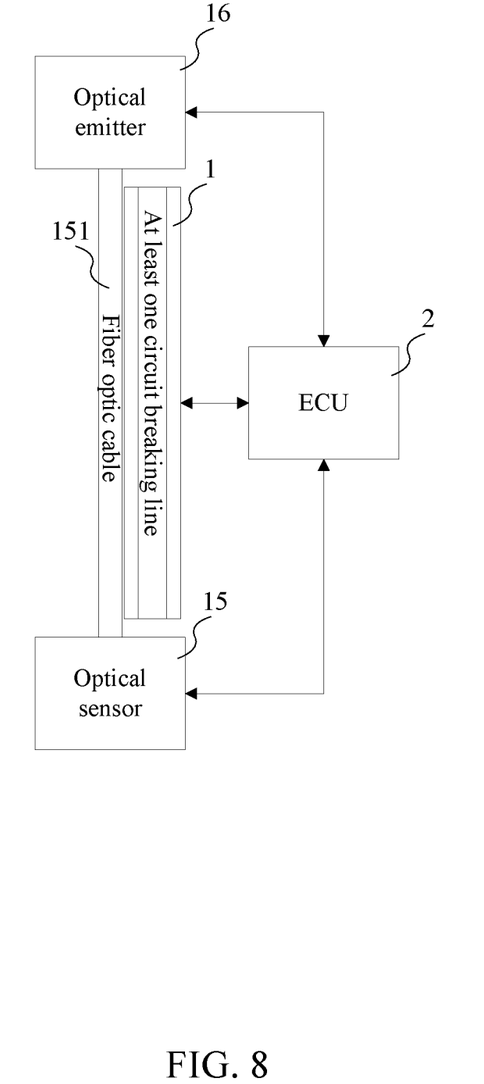
FIG. 8 is a block diagram illustrating the connections between the components of optical sensor used in an embodiment of the present invention, wherein the embodiment uses an arc-light receiver that is a fiber optic cable, which is optically connected to the emitter and the receiver.

In reference to FIG. 8, in some embodiments of the present invention, the arc-light receiver 15 is an unsheathed fiber optic cable 151. In this embodiment, the fiber optic cable 151 is continuously distributed along the transmission line 13 so that the light generated by an arc can be received along the entire length of the transmission line 13 through the fiber optic cable 151. A first end of the fiber optic cable 151 is in optical communication with the optical sensor 16 so that the light generated by the arc fault can be transferred to the optical sensor 16, through the fiber optic cable 151. Also in this embodiment, a second end of the fiber optic cable 151 is in optical communication with an optical emitter 17 so that the present invention is able to self-diagnose any defects along the fiber optic cable 151. In addition, the optical emitter 17 is electronically connected to the ECU 2 so that the ECU 2 is able to instruct the optical emitter 17 to send a test beam through the fiber optic cable 151. If the ECU 2 detects the test beam at the first end of the fiber optic cable 151, then the present invention is able to confirm that there are no defects along the fiber optic cable 151. If the ECU 2 does not detect the test beam at the first end of the fiber optic cable 151, then the present invention is able to confirm that there are defects along the fiber optic cable 151. As a result, the ECU 2 is able to test the fiber optic cable 151 to determine if the fiber optic cable 151 is operating properly.

Figure 9:
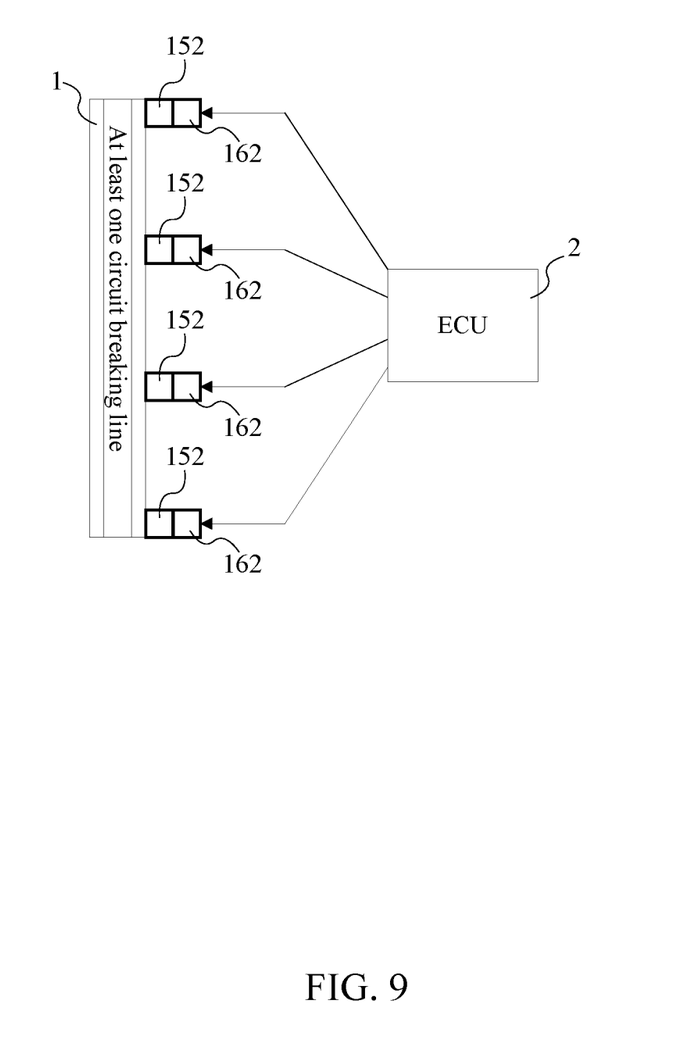
FIG. 9 is a block diagram illustrating the connections between the components of optical sensor used in another embodiment of the present invention, wherein the embodiment uses an arc-light receiver that is a plurality of distinct receivers, each of which is optically connected to a corresponding photo-sensor of the plurality of photo-sensors.

In reference to FIG. 1 and FIG. 9, in the preferred embodiment of the present invention, the arc-light receiver 15 is a plurality of distinct receivers 152. In addition, the plurality of distinct receivers 152 is discretely distributed along the transmission line 13.

As a result, the light generated by arc can be received at any point along the transmission line 13. Also in the preferred embodiment, the optical sensor 16 is a plurality of photo sensors. In the present invention, each of the plurality of distinct receivers 152 is in optical communication a corresponding photo-sensor from the plurality of photo-sensors 161. As a result, the light transferred into each distinct receiver is delivered to a dedicated photo-sensor.

Figure 7:
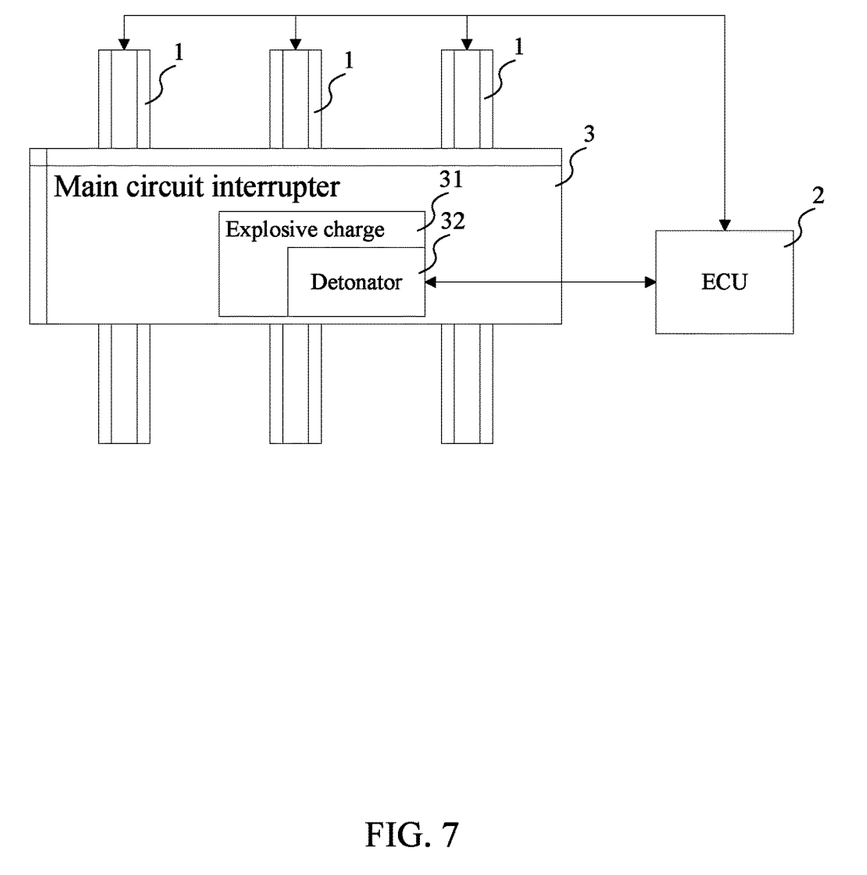
FIG. 7 is a block diagram illustrating the connections between the components of the main circuit interrupter used in the present invention.

In reference to FIG. 7, in the preferred embodiment of the present invention, the main circuit interrupter 3 comprises an explosive charge 31 and a detonator 32 that are used to open the circuit between the input terminal 11 and the output terminal 12 of the at least one circuit breaking lines 1. The detonator 32 is integrated into the explosive charge 31 so that the detonator 32 can trigger the explosive charge 31. In addition, the detonator 32 is electrically connected to the ECU 2 so that the ECU 2 is able to generate signals that cause the detonator 32 to trigger the explosive charge 31.

In reference to FIG. 1, in the preferred embodiment of the present invention, the input terminal 11 is a shunt trip 111 that prevents electrical power from flowing into the transmission line 13 when the shunt trip 111 is open. The shunt trip 111 is electrically connected to the ground so that electrical power is redirected to electrical ground when the shunt trip 111 is open. In addition, the shunt trip 111 is electrically connected to the ECU 2 so that the ECU 2 is able to generate a control signal that directs the shunt trip 111 to move into the open position. Electrical power is able to flow into the transmission line 13 while the shunt trip 111 is in the flossed position. In the preferred embodiment of the present invention, the output terminal 12 is a current transformer that conditions the electrical power transferred through the transmission line 13.

Although the invention has been explained in relation to its preferred embodiment, it is to be understood that many other possible modifications and variations can be made without departing from the spirit and scope of the invention as hereinafter claimed.

What is claimed is:

1. A fuse box for mitigating arc faults and current surges comprises:
   at least one circuit breaking line;
   an electronic control unit (ECU);
   a main circuit interrupter;
   each of the at least one circuit breaking line comprises an input terminal, an output terminal, a transmission line, a current controlled circuit interrupter (CCCI), an arc-light receiver, and an optical sensor;
   the input terminal, the CCCI, the output terminal being electrically connected in series through the transmission line;
   the main circuit interrupter being electrically integrated into the transmission line for each of the at least one circuit breaking line;
   the arc-light receiver being laterally positioned along the transmission line;
   the arc-light receiver being in optical communication with the optical sensor;
   the output terminal for one of the at least one circuit breaking line being electrically connected to the ECU;
   the optical sensor and the CCCI being electronically connected to the ECU; and
   the ECU being electronically connected to the main circuit interrupter.

2. The fuse box for mitigating arc faults and current surges as claimed in claim 1 comprises:
   a housing; and
   the at least one circuit breaking line, the ECU, and the main circuit interrupter being mounted with the housing.

3. The fuse box for mitigating arc faults and current surges as claimed in claim 2 comprises:
   the housing comprises a main body, a component compartment, a door, a locking mechanism, a ground bus, and an external mounting mechanism;
   the component compartment traversing into the main body;
   the door being hingedly and adjacently connected to the main body at a first edge of the component compartment;
   the locking mechanism being adjacently connected to the main body at a second edge of the component compartment, opposite the door;
   the ground bus being mounted within the component compartment;
   the external mounting mechanism being mounted adjacent to the main body, perpendicular to the door;
   the at least one circuit breaking line, the ECU, and the main circuit interrupter being mounted within the component compartment; and
   the at least one circuit breaking line, the ECU, and the main circuit interrupter being electrically connected to the ground bus.

4. The fuse box for mitigating arc faults and current surges as claimed in claim 1 comprises:
   a capacitor trip module; and
   the capacitor trip module being electrically connected to the ECU.

5. The fuse box for mitigating arc faults and current surges as claimed in claim 1 comprises:

an internal battery; and
the internal battery being electrically connected to the ECU.

6. The fuse box for mitigating arc faults and current surges as claimed in claim 1 comprises:
the CCCI comprises a current limiting fuse and a low voltage controlled fuse;
the current limiting fuse and the low voltage controlled fuse being electrically connected in parallel with each other; and
the current limiting fuse and the low voltage controlled fuse being electronically connected to the ECU.

7. The fuse box for mitigating arc faults and current surges as claimed in claim 1 comprises:
the arc-light receiver being a fiber optic cable;
the fiber optic cable being continuously distributed along the transmission line; and
the optical sensor being in optical communication with a first end of the fiber optic cable.

8. The fuse box for mitigating arc faults and current surges as claimed in claim 7 comprises:
an optical emitter;
the optical emitter being electronically connected to the ECU; and
the optical emitter being in optical communication with a second end of the fiber optic cable.

9. The fuse box for mitigating arc faults and current surges as claimed in claim 1 comprises:
the arc-light receiver being a plurality of distinct receivers;
the optical sensor being a plurality of photo-sensors;
the plurality of distinct receivers being discretely distributed along the transmission line; and
each of the plurality of distinct receivers being in optical communication with a corresponding photo-sensor from the plurality of photo-sensors.

10. The fuse box for mitigating arc faults and current surges as claimed in claim 1 comprises:
the main circuit interrupter comprises a detonator and an explosive charge;
the detonator being integrated into the explosive charge; and
the detonator being electrically connected to the ECU.

11. The fuse box for mitigating arc faults and current surges as claimed in claim 1 comprises:
the input terminal being a shunt trip;
the shunt trip being electrically connected to the ground bus; and
the shunt trip being electrically connected to the ECU.

12. The fuse box for mitigating arc faults and current surges as claimed in claim 1 comprises:
the output terminal being a current transformer.

13. A fuse box for mitigating arc faults and current surges comprises:
at least one circuit breaking line;
an electronic control unit (ECU);
a main circuit interrupter;
each of the at least one circuit breaking line comprises an input terminal, an output terminal, a transmission line, a current controlled circuit interrupter (CCCI), an arc-light receiver, and an optical sensor;
the main circuit interrupter comprises a detonator and an explosive charge;
the CCCI comprises a current limiting fuse and a low voltage controlled fuse;
the input terminal, the CCCI, the output terminal being electrically connected in series through the transmission line;
the main circuit interrupter being electrically integrated into the transmission line for each of the at least one circuit breaking line;
the arc-light receiver being laterally positioned along the transmission line;
the arc-light receiver being in optical communication with the optical sensor;
the optical sensor and the CCCI being electronically connected to the ECU;
the ECU being electronically connected to the main circuit interrupter;
the current limiting fuse and the low voltage controlled fuse being electrically connected in parallel with each other;
the current limiting fuse and the low voltage controlled fuse being electronically connected to the ECU;
the detonator being integrated into the explosive charge; and
the detonator being electrically connected to the ECU.

14. The fuse box for mitigating arc faults and current surges as claimed in claim 13 comprises:
a housing;
the housing comprises a main body, a component compartment, a door, a locking mechanism, a ground bus, and an external mounting mechanism;
the at least one circuit breaking line, the ECU, and the main circuit interrupter being mounted with the housing;
the component compartment traversing into the main body;
the door being hingedly and adjacently connected to the main body at a first edge of the component compartment;
the locking mechanism being adjacently connected to the main body at a second edge of the component compartment, opposite the door;
the ground bus being mounted within the component compartment;
the external mounting mechanism being mounted adjacent to the main body, perpendicular to the door;
the at least one circuit breaking line, the ECU, and the main circuit interrupter being mounted within the component compartment; and
the at least one circuit breaking line, the ECU, and the main circuit interrupter being electrically connected to the ground bus.

15. The fuse box for mitigating arc faults and current surges as claimed in claim 13 comprises:
a capacitor trip module;
the capacitor trip module being electrically connected to the ECU; and
the output terminal for one of the at least one circuit breaking line being electrically connected to the ECU.

16. The fuse box for mitigating arc faults and current surges as claimed in claim 13 comprises:
an internal battery;
the internal battery being electrically connected to the ECU; and
the output terminal for one of the at least one circuit breaking line being electrically connected to the ECU.

17. The fuse box for mitigating arc faults and current surges as claimed in claim 13 comprises:
an optical emitter;
the arc-light receiver being a fiber optic cable;

the fiber optic cable being continuously distributed along the transmission line;
the optical sensor being in optical communication with a first end of the fiber optic cable;
the optical emitter being electronically connected to the ECU; and
the optical emitter being in optical communication with a second end of the fiber optic cable.

18. The fuse box for mitigating arc faults and current surges as claimed in claim 13 comprises:
the arc-light receiver being a plurality of distinct receivers;
the optical sensor being a plurality of photo-sensors;
the plurality of distinct receivers being discretely distributed along the transmission line; and
each of the plurality of distinct receivers being in optical communication with a corresponding photo-sensor from the plurality of photo-sensors.

19. The fuse box for mitigating arc faults and current surges as claimed in claim 13 comprises:
the input terminal being a shunt trip;
the output terminal being a current transformer;
the shunt trip being electrically connected to the ground bus; and
the shunt trip being electrically connected to the ECU.

* * * * *